US008345837B2

(12) United States Patent
Chavez et al.

(10) Patent No.: US 8,345,837 B2
(45) Date of Patent: Jan. 1, 2013

(54) PREVENTING UNINTENDED USERS FROM ACCESSING A RE-ROUTED COMMUNICATION

(75) Inventors: Timothy R. Chavez, Austin, TX (US); Jacob D. Eisinger, Austin, TX (US); Michael C. Hollinger, Austin, TX (US); Jennifer E. King, Austin, TX (US); Christina K. Lauridsen, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1275 days.

(21) Appl. No.: 12/115,684

(22) Filed: May 6, 2008

(65) Prior Publication Data

US 2009/0279677 A1    Nov. 12, 2009

(51) Int. Cl.
*H04M 11/00* (2006.01)
(52) U.S. Cl. ............. 379/93.02; 379/93.03; 379/127.02; 379/142.05
(58) Field of Classification Search ............... 379/93.02, 379/93.03, 127.02, 200, 142.05, 221.01; 370/395.32
See application file for complete search history.

(56) References Cited

U.S. PATENT DOCUMENTS

| | | | |
|---|---|---|---|
| 5,592,533 A | 1/1997 | McHenry et al. | |
| 5,845,207 A | 12/1998 | Amin et al. | |
| 6,363,248 B1 | 3/2002 | Silverman | |
| 6,404,860 B1 | 6/2002 | Casellini | |
| 6,421,437 B1 | 7/2002 | Slutsman | |
| 6,741,688 B1 | 5/2004 | Yau | |
| 7,260,205 B1 | 8/2007 | Murphy | |
| 7,319,744 B1* | 1/2008 | Arnold et al. | ............ 379/201.03 |
| 7,356,307 B1 | 4/2008 | Parker | |
| 2002/0126679 A1 | 9/2002 | Morton | |
| 2002/0186828 A1 | 12/2002 | Bushnell | |
| 2002/0194331 A1 | 12/2002 | Lewis et al. | |
| 2003/0033394 A1 | 2/2003 | Stine | |
| 2003/0059016 A1 | 3/2003 | Lieberman et al. | |
| 2003/0138085 A1 | 7/2003 | Forman et al. | |

(Continued)

OTHER PUBLICATIONS

U.S. Appl. No. 12/115,649, "Method and System for Performing Proximity Based Routing of a Phone Call," Non-Final Office Action dated Aug. 9, 2011.

(Continued)

*Primary Examiner* — Yuwen Pan
*Assistant Examiner* — Yosef K Laekemariam
(74) *Attorney, Agent, or Firm* — Yudell Isidore Ng Russell PLLC

(57) ABSTRACT

A method, system, and computer-readable medium embodying a computer program for securing a communication against access by unintended users is presented. A communication is initiated from a person using an originating telecommunication device to an intended receiving wireless telecommunication device. In response to the communication failing to connect to the intended receiving wireless telecommunication device, a telecommunications host carrier provider may re-route the communication to an alternate telecommunication device. A business authentication logic of the host carrier then determines any security or quality of service filters established by the user of the originating telecommunication device prior to the communication being initiated to prevent unintended users from accessing the communication. Upon the business authentication logic of the host carrier authorizing the communication, the communication is encrypted and re-routed to the alternate telecommunication device. Upon receipt, the user of the alternate telecommunication device may then decrypt and access the secured communication.

20 Claims, 3 Drawing Sheets

U.S. PATENT DOCUMENTS

| | | | |
|---|---|---|---|
| 2004/0022237 A1* | 2/2004 | Elliott et al. | 370/356 |
| 2004/0202300 A1 | 10/2004 | Cooper et al. | |
| 2005/0286705 A1 | 12/2005 | Contolini et al. | |
| 2006/0077956 A1 | 4/2006 | Saksena | |
| 2006/0077957 A1 | 4/2006 | Reddy | |
| 2006/0093118 A1 | 5/2006 | Agrawal et al. | |
| 2006/0135138 A1 | 6/2006 | Lazaridis | |
| 2006/0165060 A1* | 7/2006 | Dua | 370/352 |
| 2006/0227957 A1 | 10/2006 | Dolan et al. | |
| 2007/0232277 A1 | 10/2007 | Spalink | |
| 2007/0287438 A1 | 12/2007 | Hansen | |
| 2008/0004009 A1 | 1/2008 | Caldwell | |
| 2008/0112554 A1 | 5/2008 | Arnold | |
| 2008/0165948 A1 | 7/2008 | Ryals et al. | |
| 2009/0023427 A1 | 1/2009 | Kahn | |
| 2009/0086947 A1 | 4/2009 | Vendrow | |
| 2009/0279680 A1 | 11/2009 | Chavez | |
| 2009/0280785 A1 | 11/2009 | Chavez | |
| 2009/0280787 A1 | 11/2009 | Chavez | |
| 2009/0280817 A1 | 11/2009 | Chavez | |
| 2009/0280818 A1 | 11/2009 | Chavez | |
| 2010/0022230 A1 | 1/2010 | Shim et al. | |
| 2011/0021150 A1 | 1/2011 | Lin | |

OTHER PUBLICATIONS

U.S. Appl. No. 12/115,659, "Method and System for Performing Caller Based Routing of a Phone Call," Non-Final Office Action dated Aug. 9, 2011.

U.S. Appl. No. 12/115,654, "Method and System for Performing Recipient Based Routing of a Phone Call," Non-Final Office Action dated Jun. 28, 2011.

U.S. Appl. No. 12/115,663, "Method and System for Performing Routing of a Phone Call Through a Third Party Device," Non-Final Office Action dated Aug. 4, 2011.

U.S. Appl. No. 12/115,649, "Performing Proximity Based Routing of a Phone Call", Final Office Action dated Feb. 21, 2012.

U.S. Appl. No. 12/115,663, "Method and System for Performing Routing of a Phone Call Through a Third Party Device", Final Office Action dated Mar. 2, 2012.

U.S. Appl. No. 12/115,673, "Method and System for Performing Routing of a Phone Call Based on Mutual Contacts of a Contact List," Non-Final Office Action dated Oct. 24, 2011.

U.S. Appl. No. 12/115,673, "Method and System for Performing Routing of a Phone Call Based on Mutual Contacts of a Contact List," Final Office Action dated Mar. 26, 2012.

U.S. Appl. No. 12/115,659, "Performing Caller Based Routing of a Phone Call," Final Office Action dated Mar. 2, 2012.

U.S. Appl. No. 12/115,654, "Method and System for Performing Recipient Based Routing of a Phone Call," Notice of Allowance dated Apr. 6, 2012.

U.S. Appl. No. 12/115,654, "Method and System for Performing Recipient Based Routing of a Phone Call," Final Office Action dated Jan. 12, 2012.

* cited by examiner

PREVENTING UNINTENDED USERS FROM ACCESSING A RE-ROUTED COMMUNICATION

BACKGROUND OF THE INVENTION

1. Technical Field

The present invention relates in general to telecommunications, and in particular to telecommunication devices. Still more particularly, the present invention relates to securing a communication against unintended access.

2. Description of the Related Art

Telecommunication devices have become a ubiquitous aid in allowing persons to be constantly accessible. There are times when a recipient of a communication may not desire, or may be unable, to take an incoming communication, requiring the communication to be re-routed to a secondary recipient. However, there may also be times where a communication is re-routed to a secondary recipient telecommunication device, but a person other than the intended recipient is using the secondary recipient telecommunication device.

SUMMARY OF THE INVENTION

A method, system, and computer-readable medium embodying a computer program for securing a communication against access by unintended users is presented. A communication is initiated from a person using an originating telecommunication device to an intended receiving wireless telecommunication device. In response to the communication failing to connect to the intended receiving wireless telecommunication device, a telecommunications host carrier provider may re-route the communication to an alternate telecommunication device. A business authentication logic of the host carrier then determines any security or quality of service filters established by the user of the originating telecommunication device prior to the communication being initiated to prevent unintended users from accessing the communication. Upon the business authentication logic of the host carrier authorizing the communication, the communication is encrypted and re-routed to the alternate telecommunication device. Upon receipt, the user of the alternate telecommunication device may then decrypt and access the secured communication.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
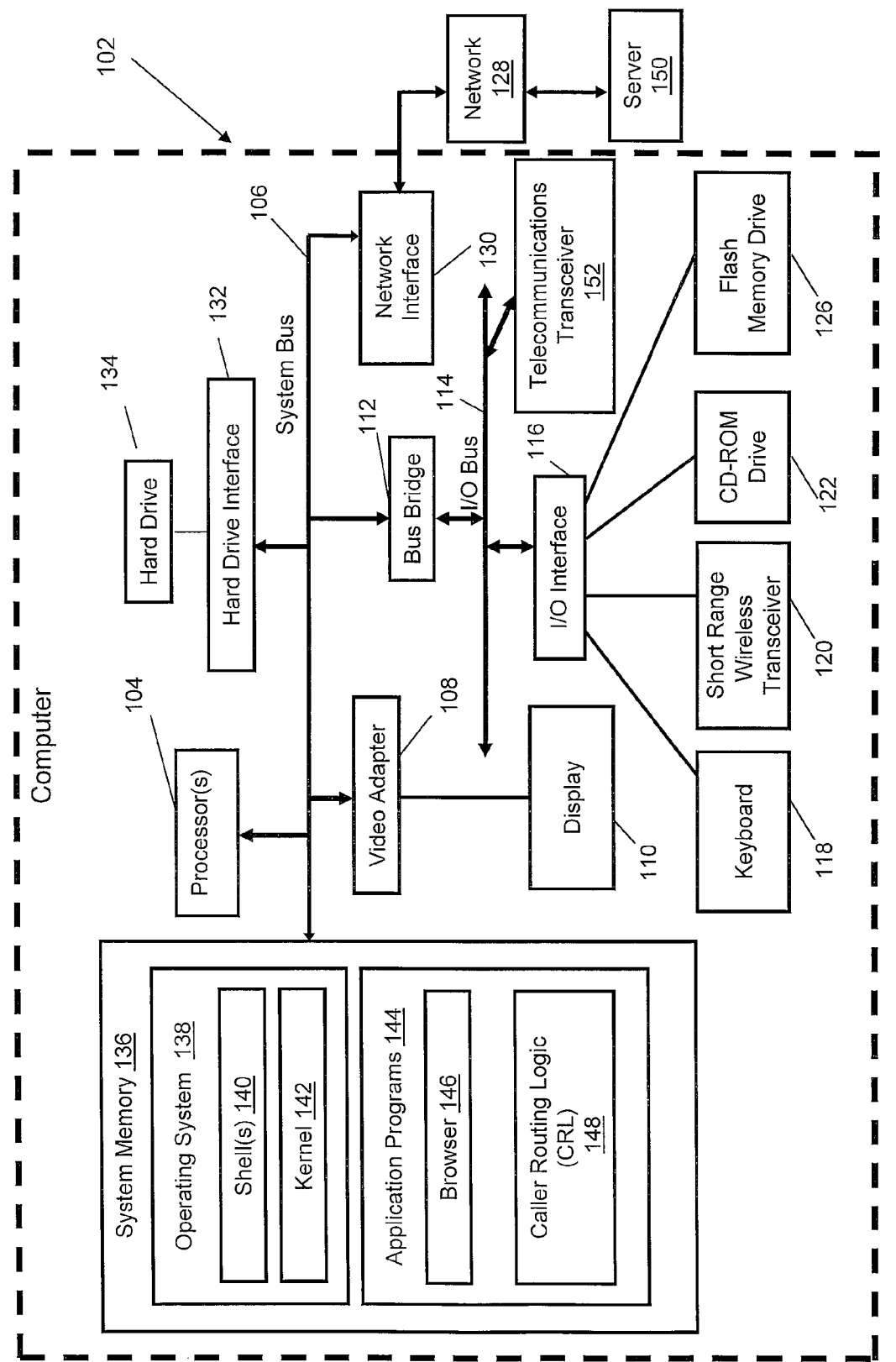
FIG. 1 is a block diagram of a telecommunication device in which the present invention may be implemented.

With reference now to FIG. 1, there is depicted a block diagram of an exemplary computer 102 in which the present invention may be implemented. Computer 102 includes one or more processors 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a Short Range Wireless Transceiver 120, a Compact Disk-Read Only Memory (CD-ROM) drive 122, and a flash drive memory 126. Keyboard 118 may be a standard keyboard (e.g., QWERTY style or similar), or a condensed alphanumeric keypad. The format of the ports connected to I/O interface 116 may be any known to those skilled in the art of computer architecture, including but not limited to Universal Serial Bus (USB) ports. Short Range Wireless Transceiver 120 utilizes short range wireless electromagnetic signals (e.g. wireless spread spectrum, radio frequency (RF), inferred (IR)) to allow Computer 102 to transmit or receive voice or data with a similarly configured telecommunication device.

Computer 102 is able to communicate with a software deploying server 150 via a network 128 using a network interface 130, which is coupled to system bus 106. Network interface 130 may utilize wired or wireless technology such as a cellular broadcast to connect with Network 128. Network 128 may be an external network such as the Internet, or an internal network such as an Ethernet or a Virtual Private Network (VPN). Note that software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150.

Application programs 144 in system memory 136 (as well as software of deploying server 150 system memory) also include a Caller Routing Logic (CRL) 148. CRL 148 includes code for implementing the processes described in FIGS. 2-3. In one embodiment, computer 102 is able to download CRL 148 from software deploying server 150, including in an "on demand" basis, as described in greater detail below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Note further that, in an alternate embodiment of the present invention, software deploying server 150 performs all of the functions associated with the present invention (including execution of CRL 148), thus freeing computer 102 from having to use its own internal computing resources to execute CRL 148.

Figure 2:
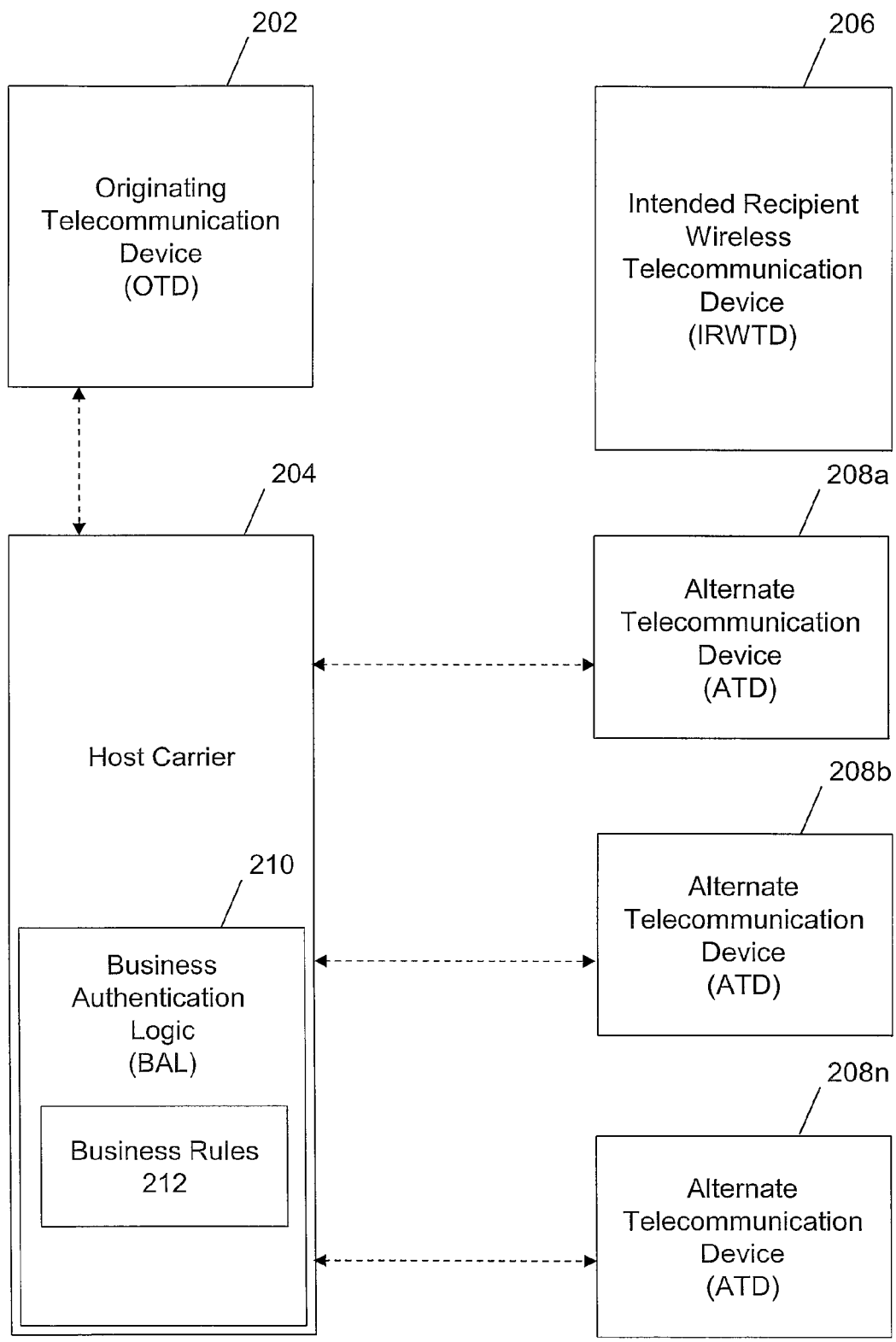
FIG. 2. is a block diagram of an exemplary system for performing re-routing of a communication to an alternate telecommunication device utilizing a business authentication logic according to one embodiment.

With reference now to FIG. 2, a block diagram of the routing system used in an exemplary embodiment of the present invention is presented. An Originating Telecommunication Device (OTD) 202 (e.g., a cell phone, a Plain Old Telephone System (POTS), a cellular Personal Assistant Device (PDA)) connected to Host Carrier 204 initiates a communication (voice call or text based message) to an Intended Receiving Wireless Telecommunication Device (IRWTD) 206. The communication itself may be a voice call, voice message, or a notification message (e.g., email, SMS message, user MMS message, etc.) composed by the user of OTD 202, or translated via speech-to-text software of Host Carrier 204. Host Carrier 204 is a remote service host such as a cellular service provider base station that is remotely connected to both OTD 202 and IRWTD 206. If IRWTD's 206 ringer is "on" (IRWTD 206 is alerting the user using tactile, auditory, or visual methods of an incoming communication) and the user chooses to accept the incoming communication, the communication will be connected. As described below, however, when IRWTD 206 is otherwise unavailable (e.g., IRWTD 206 is 'off', the ringer for IRWTD 206 is 'off', or when the call to IRWTD 206 goes unanswered), the user of OTD 202 may conclude that the communication intended for IRWTD 206 should be transmitted to a Alternate Telecommunication Device (ATD) 208a-n.

Note also the architecture shown in FIG. 1 for computer 102 may be substantially implemented in Originating Telecommunication Device (OTD) 202, Host Carrier 204, Intended Receiving Wireless Telecommunication Device (IRWTD) 206, and Alternate Telecommunication Devices (ATDS) 208a-n shown below in FIG. 2. That is, although OTD 202, IRWTD 206 and ATDs 208a-n are described as cellular phones, by including a telecommunications transceiver 152 in the architecture of computer 102, the appropriate elements illustrated as components of computer 102 can operate as a "smart" phone. A "smart phone" may communicate with a telecommunications host carrier (e.g., Host Carrier 204 shown below in FIG. 2), or a Plain Old Telephone System (POTS) system. Additionally, by including a Short Range Wireless Transceiver 120 in the architecture of computer 102, the appropriate elements illustrated as components of computer 102 can operate as an "ad-hoc" network device. This enables the device to communicate with another telecommunication device within a wireless short range proximity to computer 102 (e.g., Alternate Telecommunication Devices (ATDs) 208a-n shown below in FIG. 2).

When the user of IRWTD 206 is unavailable, a first option is for the caller who is using OTD 202 to leave a voicemail message, which will be retrievable when IRWTD 206 is either turned back on or the user becomes available. However, the user of OTD 202 may optionally initiate a re-routing attempt of the communication to one or more of ATDs 208a-n, as selected by the user of OTD 202, or based on the selected ATD 208a-n being within a physically proximate short range of IRWTD 206. Additionally, a re-routed communication may be secured by utilizing Business Authentication Logic (BAL) 210 of Host Carrier 204 to prevent inadvertent communication with a third party.

When re-routing of the communication to an ATD 208a-n being within a physically proximate short range of IRWTD 206 is desired, software internal to OTD 202 initiates an instruction of the ATD 208a-n selected by OTD 202 to scan for IRWTD 206 within a physically proximate short range. The physically proximate short range of the device is the maximum range where communication is possible between the selected ATD 208 and IRWTD 206 without the use of a network carrier service (e.g., a cell phone carrier service). Optionally, an unlicensed secure wireless personal area network (PAN), may be implemented for wireless transmission.

The physically proximate short range is further determined by the internal wireless technology common to IRWTD 206 and the selected ATD 208 (e.g., Short Range Wireless Transceiver 120). This is accomplished using software internal to the ATD 208a-n (e.g., CRL 148) that autonomously utilizes a hardware based wireless technology internal to ATDs 208a-n, such as a short-range radio or infrared signal (e.g., Short Range Wireless Transceiver 120), to transmit a wireless query signal to IRWTD 206. If IRWTD 206 receives wireless query signal, IRWTD 206 responds to ATD 208 signaling that IRWTD 206 is within a physically proximate short range of ATD 208.

BAL 210 establishes rules for routing a communication or the envelope information of a communication. BAL 210 is stored on Host Carrier 204, and may be established by the user of OTD 202. Business Rules 212 is a component of BAL 210 and functions to authorize or reject individual communications based on preferences established within BAL 210 by a user. Business Rules 212 may authorize or reject a communication based on such criteria as, but not limited to: the originating device or recipient device of the communication, the time of the communication was initiated, type of communication, etc. Business Rules 212 are the first criterion checked by the logic internal to BAL 210 (e.g., CRL 148) when a re-route request of a communication is placed. If a re-routing request of a communication satisfies criterion established by Business Rules 212, the communication is authorized and is then further authenticated by BAL 210 before the communication may be connected to a recipient. When a communication is in conflict of a preference established in Business Rules 212, the re-route of the communication is rejected. In the case where Business Rules 212 has not established a precedent for permitting or prohibiting the re-routing of a specific incoming communication, the user of OTD 202 or IRWTD 206 may be asked to specify additional preferences to be integrated into Business Rules 212. The preferences established by the user of OTD 202 or IRWTD 206 determine permissions for permitting or prohibiting future communications of that type and the quality of service for future communications of that type. Additionally, for these methods the user may specify a rationale for the communication prohibition, which may be viewed by the user of OTD 202 or by affected users of ATDs 208a-n.

BAL 210 may also restrict or permit a re-route of a communication based on Host Carrier 204 authenticating the credentials (e.g. a full name, position within a company, password, etc) of the users of OTD 202 and ATD 208a-n prior to a communication being re-routed. The credentials may be stored on the sending or receiving device (e.g., OTD 202, IRWTD 206, ATD 208a-n). Alternatively, credentials may be entered by the user of the device.

BAL 210 may establish required credentials of ATD 208a-n for accessing the communication by transmitting a secured metadata packet to the selected recipient ATD 208a-n. The secured metadata packet may instruct the user of the recipient ATD 208a-n to input credentials (e.g., password, personal identification number (PIN), user information) to ATD 208a-n, before the user of the ATD 208 may receive the communication. This metadata packet may additionally contain envelope information of the communication that is being re-routed (e.g., contact information of OTD 202 and IRWTD 206, time of transmission, length of message, etc). When the recipient of the re-routed communication cannot provide the requested credentials of the communication, the envelope information of the communication may be reviewed by the user of the ATD 208a-n, however, the user of the ATD 208a-n will not be allowed to review the communication itself.

BAL 210 may additionally institute rules for the quality of service level provided for a communication that is being re-routed to a specific ATD 208a-n. Quality of service rules may include allowing or prohibiting a communication from being routed to a specific ATD 208a-n based on the length of the communication or the time of day. Additionally, quality of service rules may allow only a specific form of communication (e.g., text message, voice call, etc) to be re-routed to a specific ATD 208a-n. Similarly, quality of service rules may limit the communication to a predefined length (e.g., time limit of a voice call, limit of text length for an email message, etc), or restrict re-routing of a communication based on the time of the communication. These rules may also prohibit re-routing of a communication to an ATD 208a-n based on ATD 208a-n being a subscriber to a different carrier network than OTD 202, or may prohibit re-routing of a communication if the OTD 202 or the desired recipient ATD 208a-n is currently roaming on a different cellular network.

A personal information hash may also be stored on ATD 208a-n, wherein upon Host Carrier 204 routing the communication to the ATD 208a-n, Host Carrier 204 determines if a personal information hash is present in the memory of the recipient ATD 208a-n, and will only allow the user of ATD 208a-n to receive the communication if the information hash is present. In one embodiment, when the recipient ATD 208a-n of the re-routed communication does not contain the requested information hash of the communication, or when Business Rules 212 rejects a communication, the envelope information of the communication may be reviewed by the user of the ATD 208a-n. In this case, however, the user of the ATD 208a-n will not be allowed to review the communication itself.

Figure 3:
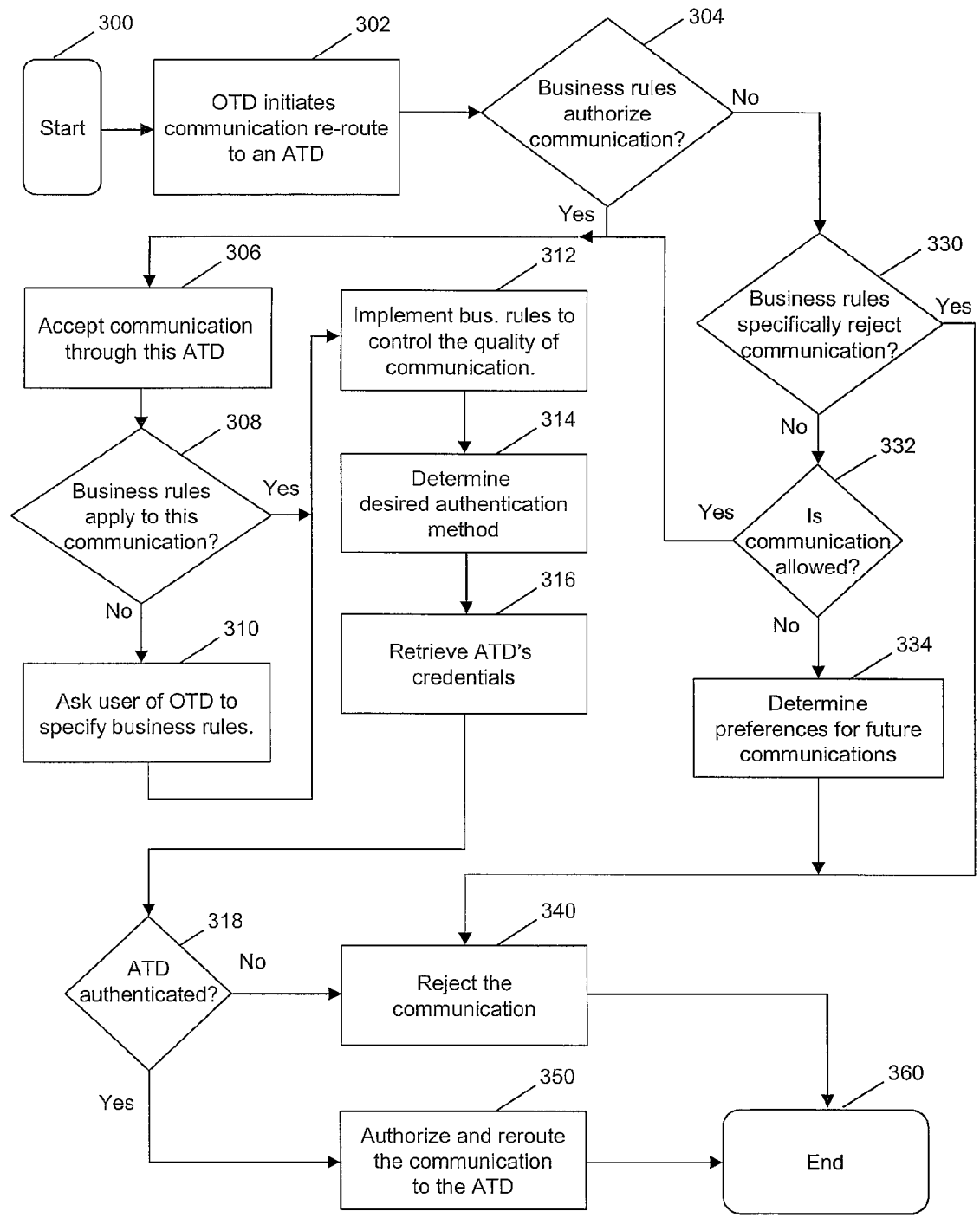
FIG. 3. is a high-level logical flowchart of an exemplary method performed while utilizing a business authentication logic to re-route a communication to an alternate telecommunication device.

With reference now to FIG. 3, a high-level logical flowchart of an exemplary method for securing a re-routed communication against unintended access based on a person using an originating telecommunication device (OTD) selecting a desired alternate telecommunication device (ATD) to be the recipient of a re-routed communication is presented. After initiator block 300, a re-route of an outgoing communication originally intended for an Intended Receiving Wireless Telecommunication Device (IRWTD) is initiated by a person using an OTD to an ATD selected by the user of the OTD (block 320). A host carrier then determines, at block 304 (block 304), if business rules of the business authentication logic (BAL) authorizes the re-route of the communication. Authorization for re-routing the communication is based on business rules for the OTD initiating the communication, the desired recipient ATD of the communication, and any business rules previously established for the type of communication being rerouted. When the business rules do not authorize the re-route of the communication, the BAL determines if the business rules specifically reject the communication (block 330). If the business rules specifically reject the re-routing request, the communication is rejected by the host carrier (block 340), and the process ends at terminator block 360. When business rules do not specifically authorize or reject the re-route request of the communication, the host carrier issues a query to the user of the originating telecommunication device to determine if this re-route of the communication and future communications of this type should be authorized (block 332). If the user of the OTD specifies that this communication and future communications of this type should not be authorized to be re-routed (block 334), the business rules of the BAL are updated (for future re-routed communications to reflect this change), and the re-route of the communication is rejected (block 340). The process then ends at terminator block 360.

When business rules authorize the re-routing of the communication to the ATD, or when a user specifies that re-routing is desired to the ATD (e.g., when no precedent has been set for a specific communication type and recipient ATD), the host carrier accepts the re-routing of the communication to the ATD (block 306). BAL then determines if any business rules apply to this communication (block 308). When no business rules apply to the communication being re-routed, the host carrier will instruct the user of OTD to specify the business rules desired for this communication (block 310).

Upon BAL determining that any business rules are applicable for performing a re-route of the communication, or when the user of OTD providing the host carrier with business rules for re-routing the outgoing communication, the host carrier will implement the business rules determined by the BAL or the user of OTD, to control the quality of the communication (block 312). The host carrier then determines the desired authentication method for the communication (e.g., personal identification number (PIN) authentication, personal information hash authentication, and the like) based on the business rules established by the BAL or the user of OTD, where applicable (block 314). Following the host carrier determining the desired authentication method for performing a re-route of the incoming communication, the host carrier initiates a query of the selected ATD to transmit credentials (e.g., the personal identification number (PIN) for the communication, personal information hash) for receiving a re-route of the incoming communication (block 316). Upon the host carrier receiving the credentials of the selected ATD, the host carrier determines if the credentials provided authenticates the ATD for receiving a re-route of the incoming communication (block 318).

If the host carrier is unable to authenticate the selected ATD for receiving a re-route of the incoming communication, the re-routing request for the incoming communication is rejected and the envelope information of the communication may be viewed by the user of the selected ATD (block 340). The process then terminates (block 360).

If the host carrier is able to authenticate the selected ATD for receiving a re-route of the incoming communication, the re-routing request for the incoming communication is accepted and the communication is re-routed to the selected ATD (block 340). The process then terminates (block 360).

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of data storage media, which include, without limitation, non-writable storage media (e.g. CD-ROM), writable storage media (e.g. a floppy diskette, hard disk drive, read/write CD-ROM, optical media). It should be understood, therefore, that such data storage media, when storing computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of authenticating a re-route of an incoming communication by a host carrier, the method comprising:
   a computer receiving a communication from a caller telecommunication device, wherein the communication is intended to reach an intended receiving telecommunication device;
   the computer determining that the intended receiving telecommunication device is unavailable;
   in response to the computer determining that the intended receiving telecommunication device is unavailable, the computer receiving a notification from the caller telecommunication device;
   the computer identifying an alternate telecommunication device as a proposed recipient of a re-route of the communication;
   the computer determining if the alternate telecommunication device is available to receive the re-route of the communication and is within a predefined proximity of the intended receiving telecommunication device;
   the computer determining if a business authentication logic allows for the alternate telecommunication device to receive rerouted communications;
   the computer determining a communication type of the communication;
   the computer determining if the business authentication logic allows for the communication type of the communication to be re-routed; and
   in response to determining that the business authentication logic allows for the alternate telecommunication device to receive rerouted communications and for the communication type to be re-routed, the computer rerouting the communication to the alternate telecommunication device.

2. The method of claim 1, further comprising:
   the computer issuing an instruction to the alternate telecommunication device to transmit credentials of the alternate telecommunication device to a host carrier for receiving the re-route of the communication; and
   in response to the host carrier authenticating the credentials of the alternate telecommunication device:
      the computer determining a quality of service level for the communication required by the business authentication logic; and
      the computer connecting the communication from the caller telecommunication device to the alternate telecommunication device at the quality of service level required by the business authentication logic.

3. The method of claim 2:
   wherein the credentials of the alternate telecommunication device include a personal identification number (PIN); and
   the method further comprising, the computer displaying only a notification message containing envelope information of the communication on the alternate telecommunication device, when the host carrier receives a mismatch to the PIN.

4. The method of claim 2, wherein the credentials of the alternate telecommunication device are personal data hashes, which personal data hashes include one or more of:
   a name of a user of the alternate telecommunication device;
   a personal information profile of the alternate telecommunication device;
   a plurality of credentials of the alternate telecommunication device for allowing re-routing of the communication; and
   a plurality of credentials of the alternate telecommunication device for disallowing re-routing of the communication.

5. The method of claim 2, wherein the communication is a phone call, and the method further comprises the computer allowing the quality of service level to establish a maximum time length for the phone call to be connected to the alternate telecommunication device.

6. The method of claim 2, wherein the communication is a text based message, and the method further comprises the computer allowing the quality of service level to establish a maximum text length of the text based message permitted to be transmitted to the alternate telecommunication device.

7. The method of claim 1, wherein the business authentication logic does not establish precedent for allowing or disallowing re-routing of a type of communication, and the method further comprises the computer transmitting an instruction to the caller telecommunication device to specify preferences for re-routing future communications of the type of communication.

8. A host carrier comprising:
   a processor;
   a telecommunications transceiver for routing a communication from a caller telecommunication device to an alternate telecommunication device; and
   a tangible computer readable storage device;

processing logic, stored on the storage device and executable by the processor, to:
receive a communication from the caller telecommunication device, wherein the communication is intended to reach an intended receiving telecommunication device;
determine that the intended receiving telecommunication device is unavailable;
in response to determining that the intended receiving telecommunication device is unavailable, receive a notification from the caller telecommunication device;
identifying an alternate telecommunication device as a proposed recipient of a re-route of the communication;
determine if the alternate telecommunication device is available to receive the re-route of the communication and is within a predefined proximity of the intended receiving telecommunication device;
determine if a business authentication logic allows for the alternate telecommunication device to receive re-routed communications;
determine if the business authentication logic allows for a type of the communication to be re-routed; and
in response to determining that the business authentication logic allows for the alternate telecommunication device to receive rerouted communications and for the type of the communication to be re-routed, reroute the communication to the alternate telecommunication device.

9. The host carrier of claim 8, further comprising processing logic, stored on the storage device and executable by the processor, to:
issue an instruction to the alternate telecommunication device to transmit credentials of the alternate telecommunication device to the host carrier for receiving a re-route of the communication; and
in response to the host carrier authenticating the credentials of the alternate telecommunication device:
determine a quality of service level for the communication required by the business authentication logic; and
connect the communication from the caller telecommunication device to the alternate telecommunication device at the quality of service level required by the business authentication logic.

10. The host carrier of claim 9:
wherein the credentials of the alternate telecommunication device include a personal identification number (PIN); and
wherein the host carrier further comprises processing logic, stored on the storage device and executable by the processor, to, display only a notification message containing envelope information of the communication on the alternate telecommunication device, when the host carrier receives a mismatch to the PIN.

11. The host carrier of claim 9, wherein the credentials of the alternate telecommunication device are personal data hashes, which personal data hashes include one or more of:
a name of a user of the alternate telecommunication device;
a personal information profile of the alternate telecommunication device;
a plurality of credentials of the alternate telecommunication device for allowing re-routing of the communication; and
a plurality of credentials of the alternate telecommunication device for disallowing re-routing of the communication.

12. The host carrier of claim 9, wherein the communication is a phone call, and wherein the host carrier further comprises processing logic, stored on the storage device and executable by the processor, to allow the quality of service level to establish a maximum time length for the phone call to be connected to the alternate telecommunication device.

13. The host carrier of claim 9, wherein the communication is a text based message, and wherein the host carrier further comprises processing logic, stored on the storage device and executable by the processor, to allow the quality of service level to establish a maximum text length of the text based message permitted to be transmitted to the alternate telecommunication device.

14. The host carrier of claim 8, wherein the business authentication logic does not establish precedent for allowing or disallowing re-routing of a type of communication, and wherein the host carrier further comprises processing logic, stored on the storage device and executable by the processor, to transmit an instruction to the caller telecommunication device to specify preferences for re-routing future communications of the type of communication.

15. A computer program product comprising:
one or more computer-readable tangible storage devices;
program instructions, stored on at least one or the one or more storage devices and executable by a processor, to:
receive a communication from a caller telecommunication device, wherein the communication is intended to reach an intended receiving telecommunication device;
determine that the intended receiving telecommunication device is unavailable;
in response to determining that the intended receiving telecommunication device is unavailable, receive a notification from the caller telecommunication device;
identifying an alternate telecommunication device as a proposed recipient of a re-route of the communication;
determine if the alternate telecommunication device is available to receive the re-route of the communication and is within a predefined proximity of the intended receiving telecommunication device;
determine if a business authentication logic allows for the alternate telecommunication device to receive rerouted communications;
determine if the business authentication logic allows for a type of the communication to be re-routed; and
in response to determining that the business authentication logic allows for the alternate telecommunication device to receive rerouted communications and for the type of the communication to be re-routed, re-route the communication to the alternate telecommunication device.

16. The computer program product of claim 15, further comprising program instructions, stored on at least one of the one or more storage devices and executable by the processor, to:
issue an instruction to the alternate telecommunication device to transmit credentials of the alternate telecommunication device to a host carrier for receiving the re-route of the communication; and
in response to the host carrier authenticating the credentials of the alternate telecommunication device:
determine a quality of service level for the communication required by the business authentication logic; and
connect the communication from the caller telecommunication device to the alternate telecommunication device at the quality of service level required by the business authentication logic.

17. The computer program product of claim 16:
wherein the credentials of the alternate telecommunication device include a personal identification number (PIN); and
wherein the computer program product further comprises program instructions, stored on at least one of the one or more storage devices and executable by the processor, to display only a notification message containing envelope information of the communication on the alternate telecommunication device, when the host carrier receives a mismatch to the PIN.

18. The computer program product of claim 16, wherein the credentials of the alternate telecommunication device are personal data hashes, which personal data hashes include one or more of:
a name of a user of the alternate telecommunication device;
a personal information profile of the alternate telecommunication device;
a plurality of credentials of the alternate telecommunication device for allowing re-routing of the communication; and
a plurality of credentials of the alternate telecommunication device for disallowing re-routing of the communication.

19. The computer program product of claim 16, wherein the communication is a phone call, and wherein the computer program product further comprises program instructions, stored on at least one of the one or more storage devices and executable by the processor, to allow the quality of service level to establish a maximum time length for the phone call to be connected to the alternate telecommunication device.

20. The computer program product of claim 15, wherein the business authentication logic does not establish precedent for allowing or disallowing re-routing of a type of communication, and wherein the further comprises program instructions, stored on at least one of the one or more storage devices and executable by the processor, to transmit an instruction to the caller telecommunication device to specify preferences for re-routing future communications of the type of communication.

* * * * *